United States Patent [19]

Knauf et al.

[11] 3,770,468

[45] Nov. 6, 1973

[54] PROCESS FOR TREATING PLASTER OF PARIS

[75] Inventors: Alfons Knauf, Siersburg; Peter Hartmann, Kitzingen/Main; Adolf Schmidt; Franz Wirsching, both of Iphofen, all of Germany

[73] Assignee: Gebr. Knauf Westdeutsche Gipswerke, Iphofen/Mfr., Germany

[22] Filed: May 10, 1971

[21] Appl. No.: 141,939

[30] Foreign Application Priority Data

May 15, 1970 Germany.................. P 20 23 853.3

[52] U.S. Cl.................................. 106/110, 106/111
[51] Int. Cl............................................ C04b 11/00
[58] Field of Search..................... 106/109, 110, 111

[56] References Cited
UNITED STATES PATENTS
3,311,516   3/1967   Jaunarajs et al.................... 106/110

FOREIGN PATENTS OR APPLICATIONS
252,455   5/1963   Australia............................. 106/110

*Primary Examiner*—James E. Poer
*Attorney*—Holman & Stern

[57] ABSTRACT

A plaster of paris which can be quickly mixed with water to produce a uniform and malleable mortar is produced by spraying powdered burnt plaster of paris with an aqueous solution of a wetting effect material, the amount of water being such that the plaster remains powdered but that the anhydrite III contained in the plaster of paris is converted to the hemihydrate.

7 Claims, No Drawings

PROCESS FOR TREATING PLASTER OF PARIS

The present invention relates to a process for treating freshly burnt plaster of Paris by mixing it with an aqueous solution. By use of the term "burnt plaster of Paris" is meant plaster of Paris prepared by burning (calcining) calcium sulphate dihydrate.

If conventional plasters of Paris are to be mixed quickly and profitably, difficulties always arise. These difficulties result from inhomogeneities of the mixed mortar, which will contain lumps and particles which make further treatment of the plaster on the surface to which it has been applied very difficult. The particles harden in the plaster earlier than the remainder of the plaster so that hard spots form in the otherwise soft plaster surface. This results from the poor mixing ability of the plaster of Paris with water and from the varying anhydrite III content of individual batches of plaster of Paris.

It is an object of the invention to treat burnt plaster of Paris in such a way that it can be mixed with water quickly and with complete uniformity and that the result achieved in this way is a malleable mortar that can easily be handled.

The invention consists in a process for the treatment of plaster of Paris in which an aqueous solution of a wetting effect material is mixed with ground, dry plaster of Paris, the amount of water being such that the plaster of Paris remains powdered but that anhydrite III contained in the plaster of Paris is converted to the hemihydrate. The aqueous solution is preferably sprayed onto the finely divided plaster of Paris while it is continuously mixed.

This treatment is to be carried out in the factory directly after manufacture of the plaster of Paris. Either pure plaster of Paris or a mixture of pure plaster of Paris with various additives, such as expanded perlite, quartz sand, clay, talc, bentonites, vermiculites or limestone gravel, can be used.

Burnt plaster of Paris contains considerable quantities, e.g., 50 percent, of anhydrite III, the precise quantity depending upon the burning process and conditions. Therefore, when the water is sprayed onto the powdered plaster of Paris, it remains in a powdered condition, as the water is immediately fixed chemically by the anhydrite III. As a result of this, the anhydrite III, which contains no water of crystallisation, is converted into the hemihydrate which contains 6.2 percent water of crystallisation. In addition, small amounts of water may be bonded to the surface of the particles to form the ⅔-hydrate. The amount of water to be supplied need not, therefore, be exactly the stoichiometric quantity required by the anhydrite III content.

The absorption of water by anhydrite III only occurs in the manner desired if the water which is used contains a wetting effect material; such materials cause the water to be absorbed uniformly by the anhydrite III and, accordingly, no particle or lump formation occurs in the plaster of Paris as a result of the supply of water. Thus, the terminology "wetting effect material" as used herein and in the appended claims shall be understood to refer to materials which have a wetting action on anhydrite III.

Aqueous solutions of the following compounds may be used:

1. Phosphates and polyphosphates, such as sodium tripolyphosphate ($Na_5P_3O_{10}$), sodium trimetaphosphate ($NaPO_3)_3$, Graham's salt $(NaPO_3)_n \cdot H_2O$, Kurrol salt $(KPO_3)_n$; or electrolytes with similar effects.
2. Carboxylic acids with at least four carbon atoms and at least one hydroxyl group, e.g., citric acid, gluconic acid, and their alkali salts.
3. Ionogenic wetting agents, such as alkyl benzenesulphonates, alkyl sulphonates, alkyl sulphates, alkyl or alkylphenolether sulphates, alkyl or alkylphenolether phosphates.
4. Non-ionogenic wetting agents, such as alkyl polyglycol ether, alkylphenol polyglycol ether.

Compounds of Groups 1 and 2 are also retarders of set. If retarders of set are also sprayed on, then their effectiveness is more pronounced, because the distribution is better than during dosage in the mixed process. An aqueous solution containing an individual compound from any of Groups 1 to 4 can be used, as can a mixture of compounds within a single group, but one can also use a mixture of compounds from different groups, for example, a solution containing a polyphosphate and a hydroxy carboxylic acid. The solution preferably contains up to 10 percent of a hydroxy carboxylic acid, or up to 10 percent of a polyphosphate or another wetting agent.

The solution is preferably sprayed onto the plaster of Paris, while mixing it in a flow-mixer which carries several nozzles on its upper side. However, a batch-mixer may also be used and, again, the plaster of Paris and the solution are mixed while the solution is sprayed.

Pure plaster of Paris may be treated but it is also possible to mix the plaster of Paris, before spraying, with various light additives, such as expanded perlite, in an amount up to 500 litres per tonne and/or with heavy additives, such as quartz sand or limestone gravel, in an amount up to 400 kg per tonne. Flow-mixers and batch-mixers adapted for use in spraying processes are well known in the chemical, foodstuffs and fodder industries.

The invention is further illustrated with reference to the following Example.

Over a period of 35 minutes, 5.8 tonnes of freshly burnt plaster of Paris, containing 3 percent water of crystallisation, were mixed in a flow-mixer with 162 kg (2.3 cubic metres) of expanded perlite and 580 kg of quartz sand. During this mixing, 116 litres of an aqueous solution containing 0.35 percent of a hydroxy carboxylic acid and 1.25 percent of a polyphosphate were continuously sprayed onto the solid mixture.

After spraying, the plaster of Paris contained about 5 percent water of crystallisation. In this way, the formation of particles and dihydrate were avoided during spraying. The amount of solution used represented about 20 litres per tonne of plaster.

If further retarders of set and water-retarding materials are added to the plaster of Paris mixture treated in this way, the result is a mortar ready for immediate working.

We claim:
1. A process for the treatment of plaster of Paris which comprises spraying an aqueous solution of a wetting effect material onto ground, dry plaster of Paris containing anhydrite III while mixing said aqueous solution with the plaster of Paris, the amount of water being such that the plaster of Paris remains powdered but that anhydrite III contained in the plaster of Paris is converted to the hemihydrate.

2. A process as claimed in claim 1, wherein the said solution contains a retarder of set.

3. A process as claimed in claim 1, wherein the solution contains a wetting agent.

4. A process as claimed in claim 1, wherein the plaster of Paris is mixed with an additive selected from expanded perlite, quartz sand, clay, talc, bentonites, vermiculites and limestone gravel.

5. A process as claimed in claim 1, wherein the amount of water used is such as to increase the content of water of crystallization of said plaster of Paris to a value of from 5 to 6.2 percent.

6. A process as claimed in claim 1, wherein the solution is used in an amount of about 20 litres per tonne of said plaster of Paris.

7. A process as claimed in claim 1, wherein the wetting effect material is selected from the group consisting of phosphates, polyphosphates, carboxylic acids having at least four carbon atoms and at least one hydroxy group, ionogenic wetting agents and non-ionogenic wetting agents.

* * * * *